United States Patent
Syvänne et al.

(10) Patent No.: US 7,406,534 B2
(45) Date of Patent: Jul. 29, 2008

(54) FIREWALL CONFIGURATION VALIDATION

(75) Inventors: Tuomo Syvänne, Vantaa (FI); Eino Lilius, Espoo (FI)

(73) Assignee: Stonesoft Corporation, Helsinki (FI)

( * ) Notice: Subject to any disclaimer, the term of this patent is extended or adjusted under 35 U.S.C. 154(b) by 831 days.

(21) Appl. No.: 10/321,851

(22) Filed: Dec. 18, 2002

(65) Prior Publication Data

US 2003/0149766 A1  Aug. 7, 2003

(30) Foreign Application Priority Data

Dec. 18, 2001 (EP) ................................ 01660236

(51) Int. Cl.
*G06F 15/173* (2006.01)
(52) U.S. Cl. .................... 709/238; 726/11; 709/224
(58) Field of Classification Search ................ 709/224, 709/238, 227, 223, 249, 235, 229; 726/1, 726/15, 3, 23, 11; 713/201; 370/389, 392, 370/395.31; 705/9
See application file for complete search history.

(56) References Cited

U.S. PATENT DOCUMENTS

| | | | | |
|---|---|---|---|---|
| 6,009,475 | A * | 12/1999 | Shrader ....................... | 709/249 |
| 6,158,010 | A | 12/2000 | Moriconi et al. | |
| 6,233,686 | B1 * | 5/2001 | Zenchelsky et al. ............ | 726/1 |
| 6,574,666 | B1 * | 6/2003 | Dutta et al. .................. | 709/227 |
| 6,684,244 | B1 * | 1/2004 | Goldman et al. ............ | 709/223 |
| 6,738,909 | B1 * | 5/2004 | Cheng et al. ................... | 726/3 |
| 6,772,214 | B1 * | 8/2004 | McClain et al. ............. | 709/229 |
| 6,772,223 | B1 * | 8/2004 | Corl et al. .................... | 709/238 |
| 6,832,322 | B1 * | 12/2004 | Boden et al. ................. | 726/15 |
| 6,839,850 | B1 * | 1/2005 | Campbell et al. ............. | 726/23 |
| 6,947,983 | B2 * | 9/2005 | Corl et al. .................... | 709/224 |
| 7,027,446 | B2 * | 4/2006 | Rosenfeld et al. ...... | 370/395.31 |
| 7,039,053 | B1 * | 5/2006 | Freed et al. .................. | 370/392 |
| 2001/0000193 | A1 * | 4/2001 | Boden et al. ................. | 713/201 |
| 2003/0005144 | A1 * | 1/2003 | Engel et al. .................. | 709/235 |

(Continued)

FOREIGN PATENT DOCUMENTS

EP          0 856 974 A2     8/1998

(Continued)

OTHER PUBLICATIONS

Hazelhurst et al., "Algorithms for Improving the Dependability of Firewall and Filter Rule Lists," Proceedings International Conference on Dependable Systems and Networks, Jun. 25-28, 2000, NY, International Conference on Dependable Systems and Networks, Los Alamitos, CA: IEEE Comp. Soc. US. pp. 576-585.

*Primary Examiner*—Jungwon Chang
(74) *Attorney, Agent, or Firm*—Barnes & Thornburg LLP

(57) ABSTRACT

The invention relates to processing configuration of a network node, such as for example a firewall, and for sharing the configuration management between several administrators. The configuration comprises a processing rule base, which contains rules to be used in the network node for filtering data packets, the rules comprising one or more identification values for identifying a data packet and an action. The configuration of the network node is validated by determining, whether the processing rule base fulfils requirements defined in a validation rule base. The use of validation rule base enables verifying that processing rule bases managed by different administrators fulfil some set requirements. Additionally, the invention accounts for detecting human errors in configurations.

21 Claims, 7 Drawing Sheets

U.S. PATENT DOCUMENTS

| | | | |
|---|---|---|---|
| 2003/0074248 A1* | 4/2003 | Braud et al. | 705/9 |
| 2003/0120622 A1* | 6/2003 | Nurmela et al. | 706/47 |
| 2003/0149766 A1* | 8/2003 | Syvanne et al. | 709/224 |
| 2004/0013112 A1* | 1/2004 | Goldberg et al. | 370/389 |

FOREIGN PATENT DOCUMENTS

| | | |
|---|---|---|
| GB | 2 206 713 | 1/1989 |
| WO | WO 00/62167 | 10/2000 |
| WO | WO 01/04343 | 6/2001 |

* cited by examiner

| Rule # | Source | Destination | Service | Action |
|---|---|---|---|---|
| 401 | B | C | HTTP | Allow |
| 402 | A | C | HTTP | Refuse |
| 403 | ANY | ANY | ANY | Discard |

| Rule # | Source | Destination | Service | Action |
|---|---|---|---|---|
| 501 | A | E | ICMP | Discard |
| 502 | A | E | HTTP | Discard |
| 503 | A | B, C, E | ICMP | Allow |
| 504 | A | C | HTTP | Allow |
| 505 | A | D, E | ANY | Allow |
| 506 | A | C, F | ANY | Allow |

600

| Rule # | Source | Destination | Service | NAT |
|---|---|---|---|---|
| 601 | A | C | HTTP | Destination NAT C -> E |
| 602 | A | B | ICMP | Destination NAT B -> F |
| 603 | ANY | B | ICMP | Destination NAT B -> E |

| Service | Rule # | Source | Destination | Action |
|---|---|---|---|---|
| HTTP | 502 | A | E | Discard |
|  | 504 | A | C | Allow |
|  | 505 | A | D, E | Allow |
|  | 506 | A | C, F | Allow |
| ICMP | 501 | A | E | Discard |
|  | 503 | A | B, C, E | Allow |
|  | 505 | A | D, E | Allow |
|  | 506 | A | C, F | Allow |
| ANY | 505 | A | D, E | Allow |
|  | 506 | A | C, F | Allow |

| Service | Rule # | Source | Destination | Action |
|---|---|---|---|---|
| HTTP | 502 | A | E | Discard |
|  | 504 | A | C | Allow |
|  | 805 | A | D | Allow |
|  | 806 | A | F | Allow |
| ICMP | 501 | A | E | Discard |
|  | 803 | A | B, C | Allow |
|  | 805 | A | D | Allow |
|  | 806 | A | F | Allow |
| ANY | 505 | A | D, E | Allow |
|  | 506 | A | C, F | Allow |

| Service | Rule # | Source | Destination | NAT |
|---|---|---|---|---|
| HTTP | 601 | A | C | Destination NAT C -> E |
| ICMP | 602 | A | B | Destination NAT B -> F |
|  | 603 | ANY | B | Destination NAT B -> E |

| Service | Rule # | Source | Destination | NAT |
|---|---|---|---|---|
| HTTP | 601 | A | C | Destination NAT C -> E |
| ICMP | 602 | A | B | Destination NAT B -> F |
|  | 1003 | ANY-A | B | Destination NAT B -> E |

FIG. 10

FIREWALL CONFIGURATION VALIDATION

TECHNICAL FIELD OF THE INVENTION

The invention relates generally to management of security network elements, which perform packet filtering. In particular, the invention relates to a method and arrangements for providing a configuration of a firewall and for sharing the administration work for several administrators.

BACKGROUND OF THE INVENTION

A firewall is a gateway which operates at the same time as a connector and a separator between networks in a sense that the firewall keeps track of the traffic that passes through it from one network to another and restricts connections and packets that are defined as unwanted by the administrator of the system. Physically a firewall is a machine with appropriate software to do the tasks assigned to it. It can be a router, a personal computer (PC), a special appliance, or whatever that can be used for such purposes. A firewall is usually used for protecting an internal network of an organisation and for connecting the internal network to a public network, such as Internet. On data packet level a firewall filters data packets, which are entering and/or exiting the internal network. The rules according to which the data packets are filtered are defined in access rules. In addition to filtering data packets a firewall may secure data packets transmitted between, for example, some communication entities. In this case the firewall operates both as a firewall and a security gateway, such as a VPN (Virtual Private Network) gateway.

FIG. 1 illustrates an example with a first internal network 12, a second internal network 14 and a public network 10. The public network may be, for example, the Internet. The internal networks 12, 14 are connected to the public network 10 via firewalls 16 and 18, respectively. The firewall 16, 18 may be implemented as a single network node (server) or as a cluster of nodes. In FIG. 1, the firewall 18 is a firewall cluster comprising nodes 19a, 19b and 19c. The term security network element is used in this description for referring to a security network node or to a cluster of security network nodes, such as firewalls or routers, where data packet filtering is performed and which connects at least two networks to each other. A security network element may be, for example, a plain firewall node filtering packets or a firewall node provided with VPN functionality, or a cluster of such nodes.

Frequently, the access rules of a firewall are expressed as a table or list (rule base) of rules comprising data packet characteristics and related actions. The rule base is a central part of a security policy of a firewall. The data packet characteristics in rules are parameter values that are obtained from header fields of a data packet and may be e.g. source IP (Internet Protocol) address, destination IP address and service (or protocol) or some other values. The action gives information about how to handle a data packet, which corresponds the data packet characteristics defined in the respective rule (i.e. which matches the rule). This means that for a data packet, which has the header information indicated in a rule, the action indicated in the rule is carried out. In a firewall, the action is typically discard or allow (or deny/accept), which means the data packet is discarded or allowed to proceed, correspondingly. The rules of a rule base are examined in certain order until a decision how to process the data packet is reached. The order of the rules in the rule base typically defines the order in which header fields of a data packet are compared to the rules, that is, the rules are examined one by one from the beginning of the rule base. When a rule, to which the characteristics of a data packet match, is found, the action that is related to that rule is taken and often there is no need to continue examining the rules. However, the action defined in the rule may be continue, in which case examining the rule base is continued from the next rule, or jump, in which case examining the rule base is continued from the rule specified in the jump action. The action of the firewall may be as well refuse, which is similar to discard action. The difference is that discard action results in simply discarding the data packet and in refuse the sender of the data packet is notified of discarding the data packet.

In order to ensure that the firewall operates in desired way the firewall must be configured and managed accurately by a professional administrator. The firewall's management interface typically allows the security administrator to define various different kinds of rules. For example rules may be defined for individual hosts, host-groups, networks or IP (Internet Protocol) address ranges. In addition, the order of the rules in the rule base affects the operation of the firewall. That is, if there are two or more rules to which an individual data packet would match, the one that comes first in the rule base is taken into account. For this reason, the rules of a rule base need to be inspected as a whole when the operation of a firewall is analysed. However, the size of the rule base may be very large especially if the network that is protected with the firewall is large (and heterogeneous with regard to protection requirements). Also the structure of the rule base may be complex and the real effects of rules may not always be clear. Therefore, management of a firewall is a complex administrative task, in which mistakes are easily made.

Furthermore, the rule base used in a firewall is updated every now and then due to changed security requirements. Even a small change in the rule base may have a large effect on the total outcome and therefore also updating needs to be done by a professional administrator. In companies with several firewalls and sites, there is a need to share the responsibility and workload of managing and configuring the firewalls. However, not all administrators can necessarily be given the same rights in managing the firewalls. There may be need to enforce some general rules in firewalls organization wide and to set limitations to local administration without unnecessarily limiting the local administrators ability to make allowable changes.

Rule base templates are one possible way to control the structure of the rule base and to set non-editable rules to rule bases. For example only a super user (a special administrator whose management rights are not restricted in any way) can edit the templates, whereupon a normal administrator can edit only rule bases and a rule base is constructed on top of a template, which consists of rules like a normal rule base. Additionally the template may comprise special insert points, which are the points where the normal administrator can edit the rule base. A simple exemplary template is shown in the following:

| Rule # | Source | Destination | Service | Action | |
|---|---|---|---|---|---|
| 1 | B | C | HTTP | Allow | |
| 2 | | | INSERT | | POINT |
| 3 | ANY | ANY | ANY | Discard | |

The exemplary template above means that the first and the last rule in the rule base are fixed rules #1 and #3. A normal administrator would be able to add rules in the insert point after rule #1, but he/she cannot edit the rules #1 and #3, whereupon a rule base that extends from the template above, could look like the following for example:

| Rule # | Source | Destination | Service | Action |
|---|---|---|---|---|
| 1 | B | C | HTTP | Allow |
| 2.1 | A | C | HTTP | Allow |
| 2.2 | A | D | ANY | Allow |
| 3 | ANY | ANY | ANY | Discard |

In this example the normal administrator has added rules #2.1 and #2.2, whereupon the HTTP (HyperText Transfer Protocol) data packets from source A to destination C are allowed and any data packets from source A to destination D are allowed to proceed. But the normal administrator cannot for example deny HTTP traffic from B to C, which is allowed in rule #1. In this way the super user can restrict the management rights of a normal administrator by defining suitable template rule bases. The disadvantage of using templates is that, defining suitable, restrictive enough, but not too restrictive, templates may be very difficult.

ACLs (access control lists) are another theoretical possibility for restricting management rights of normal administrators. An ACL could be defined for each rule, but since the order of the rules plays a central role in the total effect of a rule base, this may not even possible.

Security policy may contain also NAT (network address translation) rules. NAT is the translation of an Internet Protocol address (IP address) used within one network to a different IP address known within another network. Typically, a company maps its internal network addresses to one or more public IP addresses and unmaps the public IP addresses on incoming packets back into internal IP addresses. NAT also conserves on the number of public IP addresses that a company needs and it lets the company use a single (or a limited number of) IP address for connecting a plurality of computers to public networks. NAT rules are often processed in a firewall after a matching access rule, which allows the data packet, is found. Naturally, if the data packet is not allowed, no NAT rules are required to be processed. The matching system of the NAT rules is similar to access rules, but the action of the NAT rules is to change the source and/or destination addresses of the data packets to be processed.

In access rules the source and destination addresses are always expressed as addresses that are in the header of the data packet to be processed. If a destination NAT is defined for the data packet (network address translation for the destination address), the destination address in the data packet header is not the real address of the destination. Since the destination addresses are not always the true addresses there is a risk to get confused about the effects of a rule when defining a rule base. There is an example of a destination NAT rule below. The rule is applied if the source and destination addresses in the header of the data packet to be processed on HTTP service match to the NAT rule, whereupon the original destination address C of the data packet to be processed will be translated to E according to the NAT rule.

| Rule # | Source | Destination | Service | NAT |
|---|---|---|---|---|
| 1 | B | C | HTTP | Destination NAT C → E |

If source NAT (network address translation for the source address) is defined for a data packet the source address of the data packet is changed. Source address is always the true source address in the access rules, so this doesn't cause similar confusion as the destination NAT. The use of NAT rules makes analysing the total effect of rule bases even more difficult.

In addition, NAT rules make it possible to accidentally or purposefully override the effect of fixed template rules. For example the following rule base with template rules #1 and #3 and rules #2.1 and #2.2 of a normal user can be considered:

| Rule # | Source | Destination | Service | Action |
|---|---|---|---|---|
| 1 | B | E | HTTP | Discard |
| 2.1 | B | C | HTTP | Allow |
| 2.2 | A | D | ANY | Allow |
| 3 | ANY | ANY | ANY | Discard |

The normal administrator may add for example a destination NAT rule, where the destination address is changed for the data packets to be processed like:

| Rule # | Source | Destination | Service | NAT |
|---|---|---|---|---|
| 1 | B | C | HTTP | Destination NAT C → E |

Now, if an HTTP data packet from B destined to C is processed, it is first compared to rule #1 of the rule base, which does not match because of the destination. Therefore, it is compared next to rule #2.1 of the rule base, which is a match, because the source and destination and service match. According to this rule (rule #2.1 of the rule base) the packet is allowed to proceed. Then, the associated NAT rule is applied to the data packet, which changes the destination address of the data packet to E. So HTTP data packet from B to E is allowed in this way, which is clearly in conflict with the template rule #1 of the rule base. Therefore, using templates alone do not give guaranteed result of total effect of the rules.

Therefore, there is a need for a method to enforce and/or verify the total effect of rules in a rule base.

SUMMARY OF THE INVENTION

Object of the invention is to make managing rule bases of firewalls and other network nodes easier and more reliable. Additionally, an object of the invention is to increase flexibility and effectiveness in sharing the responsibility and workload of managing and configuring the network nodes between several administrators.

The objects of the invention are achieved according to the invention as disclosed in the attached independent claims. Preferred embodiments of the invention are disclosed in the dependent claims. The features described in one dependent claim may be further combined with features described in another dependent claim to produce further embodiments of the invention.

According to the invention a validation rule base is used for setting boundaries to the total effects of a processing rule base, which may be for example access rule base of a firewall or a routing table of a router. The processing rule base is part of configuration of a network node, such as a firewall. (The configuration may include also some other settings for the network node, but they may be irrelevant considering this invention.) Further the objects of the invention are achieved by evaluating each rule of the validation rule base against the processing rule base, and accepting only a processing rule base, which has passed all the validity checks defined in the validation rules.

The invention provides a method of processing configuration of a network node, the configuration comprising a processing rule base, which contains rules to be used in the network node for filtering data packets, the rules comprising one or more identification values for identifying a data packet and an action. The method comprises the step of validating the configuration of the network node by determining, whether the processing rule base fulfils requirements defined in a validation rule base. A validation rule base comprises at least one validation rule having one or more identification values and at least one associated required action.

According to one aspect of the invention the step of determining is accomplished by finding the action(s) defined in the processing rule base for identification value(s) of a validation rule, and comparing thus obtained actions to the required action(s) in the validation rule. The validation rule is passed, if said action(s) conform to the required action(s) in said validation rule, and the validation rule is failed, if said action(s) do not conform to the required action in said validation rule. If the processing rule base does not define any action for the identification values of a validation rule, the validation fails as well, since the action required in the validation rule is not fulfilled. Each validation rule is handled in the validation process as an independent entry and the validation is passed, if all validation rules are passed.

According to another aspect of the invention the configuration is validated as a response to a predefined action, which may be for example a command by a user to perform the validation, starting up of the network node, uploading a new or modified configuration to the network node or saving a configuration.

The configuration may be rejected and/or an error message may be generated, if the requirements defined in a validation rule base are not fulfilled. Additionally or alternatively, a rule of the processing rule base, which does not conform to a validation rule, or a validation rule, which has failed, may be outputted for example to a computer screen.

In order to distribute administrative tasks several administrators may be allowed to modify or create a processing rule base, while only a super user is allowed to modify or create a validation rule base. In order to accept a processing rule base, it has to pass the validation rule base, and thus the super user can set boundaries to management abilities of the administrators. The administrators may be for example forced to use a rule base template for creating rule bases and a validation rule base may be attached to the template and checked every time a rule base created on top of the template is saved or taken into use.

Alternatively, the same administrator entity may be allowed to modify or create a processing rule base and a validation rule base. In this case, an administrator may for example create a validation rule base in order to verify that a processing rule base (which is often large and complex) fulfils some critical requirements and operates as was intended to. This way, detecting human errors made in defining or modifying a configuration is easier.

According to still other aspects of the invention a processing rule base model corresponding to the processing rule base and indicating the effective processing rule base rules is generated and used in the determining step. Similarly, a validation rule base model corresponding to the validation rule base and indicating the effective validation rule base rules is generated and used in the determining step.

According to still other aspects of the invention generating (a processing or a validation) rule base model is done by arranging rules of the rule base into groups of rules, the rules in a group having a common identification value while keeping a track of the order of the rules in the rule base. One group corresponds for example one service or port number, plurality of services or port numbers. If there exist overlapping identification value combinations in two or more rules of the rule base, the first one of the two or more rules in the order of the rules is maintained unchanged and such overlapping identification values are removed from others of the two or more rules for determining the effective identification values in each rule. This means, that the effect of the order of the rules is removed. Further, the effects of possible NAT (Network Address Translation) rules are combined into said processing rule base model by changing addresses and/or port numbers of rules in said processing rule base to real addresses and/or port numbers.

As discussed earlier the use of rule base templates doesn't give enough expression power to define the limits what the normal administrator can do for the processing rule base. The invention enables a super user to use validation rules to define the limits, what a normal administrator can change in the processing rule base. In other words, the validation rules define some criteria that the processing rule base as a whole needs to fulfil, such as for example to discard or to allow data packets with certain source/destination/service-combination. These validation rules may be for example attached to a rule base template and checked when a configuration (consisting a rule base) is loaded to a network node, such as for example to a firewall. If there are rules in the processing rule base that violate the validation rules, the configuration is not loaded to the firewall and an error message is generated. Naturally, the validation rules may be used also without a rule base template and the validation rules may be defined also by the administrators themselves.

A validation rule base according to the invention may contain one or multiple validation rules. Additionally, it is possible to verify a processing rule base against more than one validation rule base. Separate validation rule bases may be defined for different services for example. In this way the validation rule bases may be kept small and therefore their effect (requirements) are easily seen from the validation rules they contain. The combination of validation rule bases sets boundaries to total effects what the processing and/or NAT rules applied in the network node is allowed or required to do. Also the validation rule base to be used for validation may be evaluated before the use.

These and other features of the invention, as well as the advantages offered thereby, are described hereinafter with reference to embodiments illustrated in the accompanying drawings.

Brief Description of the Drawings

FIG. 6 illustrates an exemplary NAT rule base, FIGS. 7 and 8 illustrate generation of a processing rule base model for the processing rule base of FIG. 5, FIGS. 9 and 10 illustrate generation of a NAT rule base model for the NAT rule base of FIG. 6.

DETAILED DESCRIPTION

The method of the invention may be used in connection with configuring any network node, which filters data packets on the basis of a rule base. Such network node may be for example a firewall, a security gateway, a VPN gateway or a router. The network node is physically a machine with appropriate software to do the tasks assigned to it. It can be a router, a personal computer (PC), a special appliance, or whatever that can be used for such purposes. In the following description, a firewall is used as an example of a suitable network node.

Figure 1:
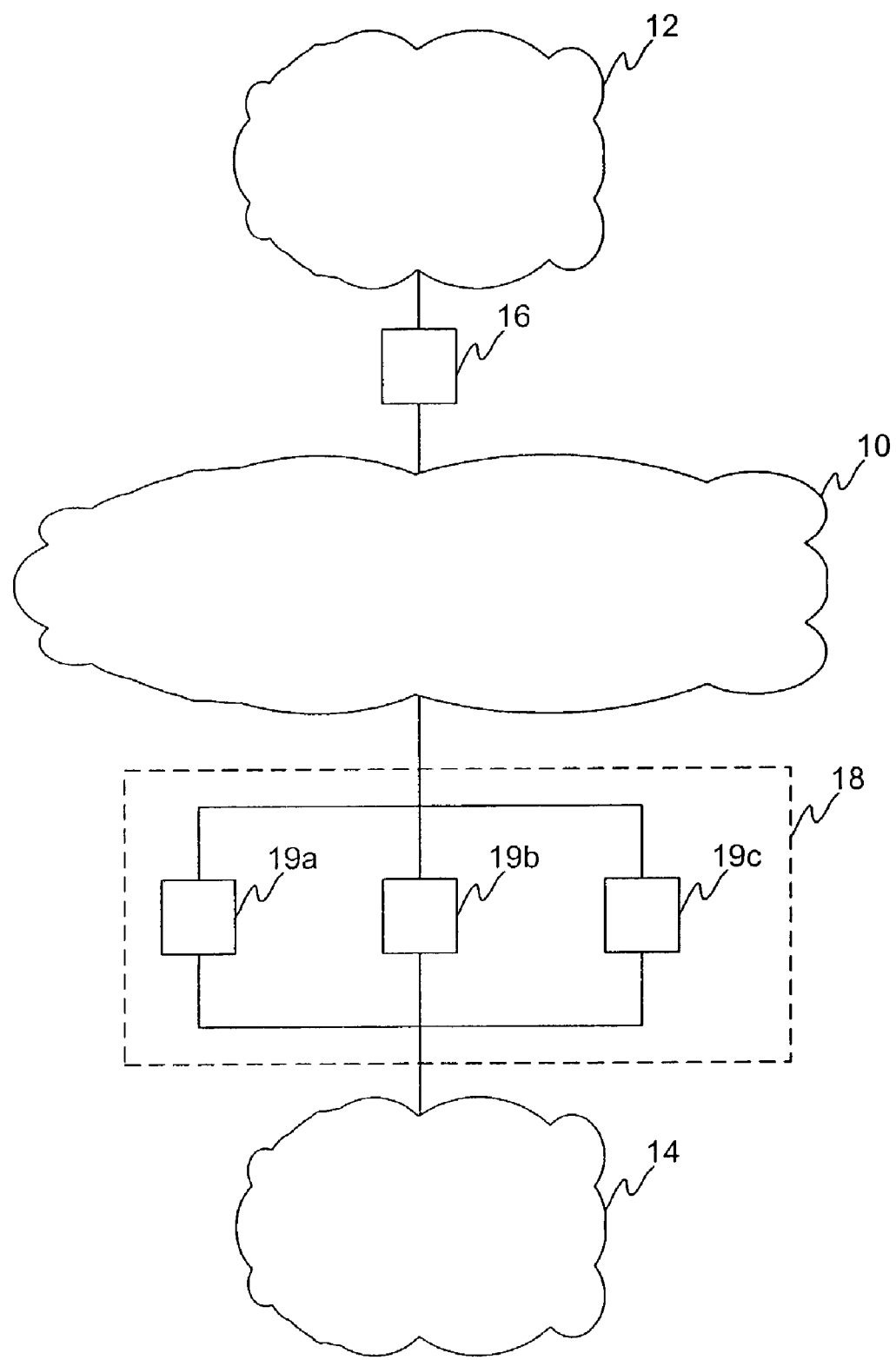
FIG. 1 illustrates two local networks connected to a public network via firewalls according to prior art.
Figure 2A:
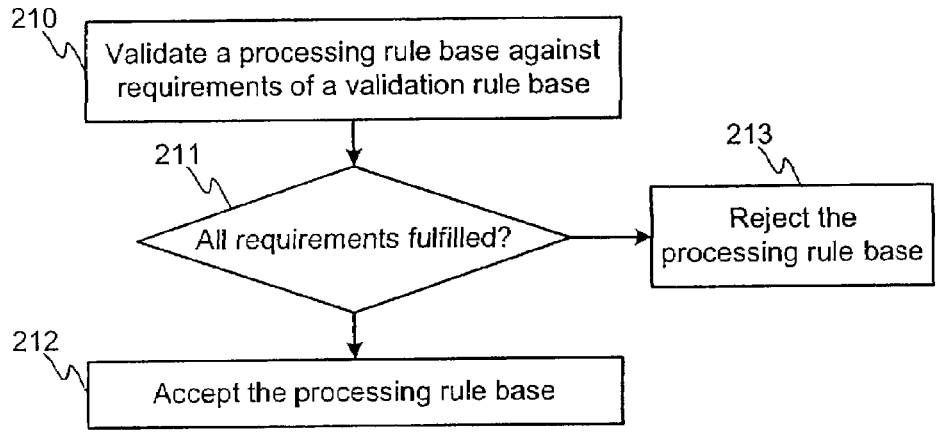
FIG. 2A is a flow diagram illustrating processing configuration of a network node according to the invention.

FIG. 2A is a flow diagram illustrating processing configuration of a network node according to the invention. In step 210, a processing rule base, which is part of a configuration of a network node, is validated against requirements of a validation rule base. The validation process may be performed whenever, for example when a user or administrator wants to, when new or modified configuration is saved or uploaded to the network node or when the network node is started up. If all requirements of the validation rule base are fulfilled (step 211), the processing rule base is accepted in step 212, and if the requirements are not fulfilled, the processing rule base is rejected in step 213.

Figure 2B:
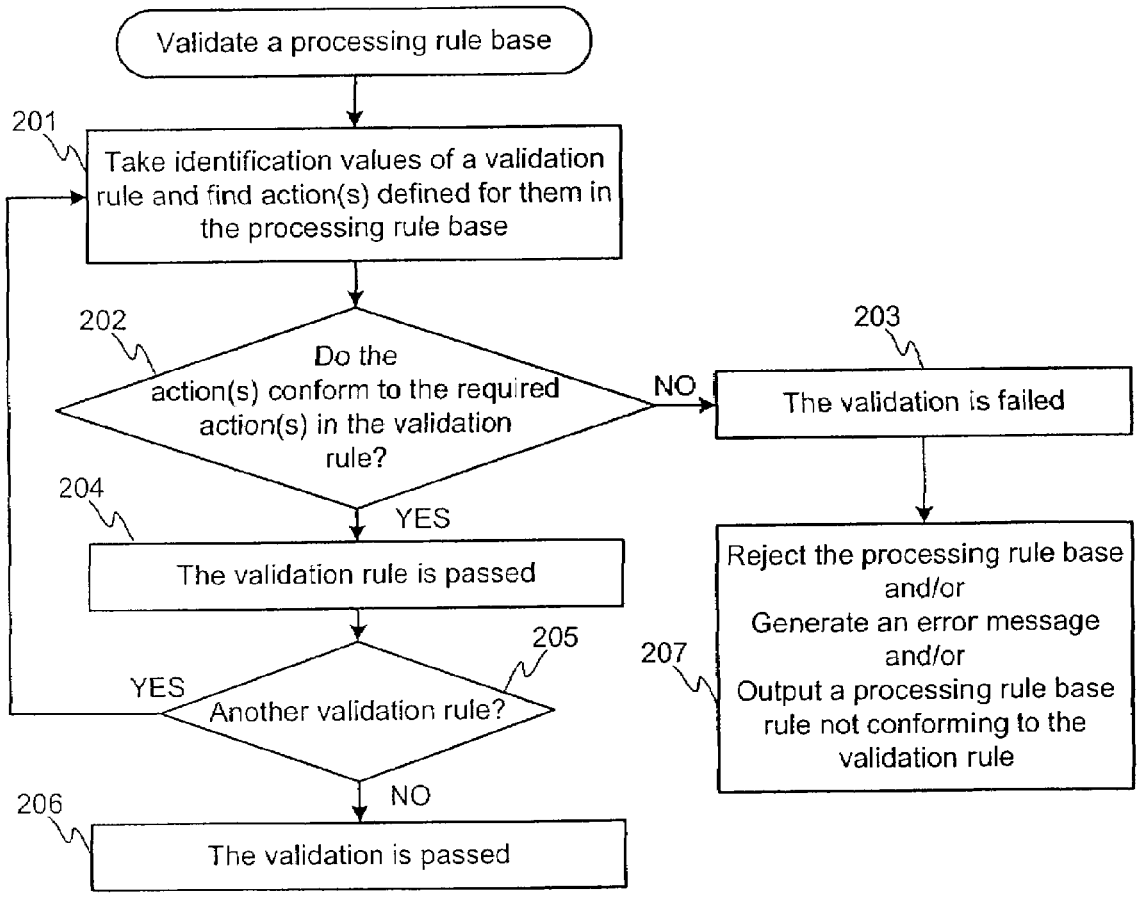
FIG. 2B is a flow diagram illustrating validation of processing rule base according to the invention.

FIG. 2B is a flow diagram illustrating validation of processing rule base according to the invention. In step 201, identification values of a validation rule a taken and the action(s) defined for them in the processing rule base are found. Thus, obtained action(s) are compared with the required action in the validation rule (step 202). If the action(s) of the processing rule base do not conform to the required action(s), the validation rule fails and therefore the validation is failed in step 203. This terminates the validation process, however, depending on the implementation, it is possible to continue handling other validation rules of the validation rule base also after this. Due to failing the validation, the processing rule base is rejected in step 207. Alternatively or additionally, an error message may be generated for the user or a processing rule base rule(s) not conforming to the validation rule may be outputted for example on a computer screen in order to inform the user where the problem is. It is also possible to highlight the non-conforming rules in a processing rule base file or to output the failing validation rule.

If the action(s) of the processing rule base do conform to the required action(s) in step 202, the validation rule passes (step 204). If there are more rules in the validation rule base, the steps of 201 and 202 are repeated for them (step 205). If all validation rules of the validation rule base have been processed (and all of them have passed), the validation process is passed in step 206.

Figures 3, 4, 5:
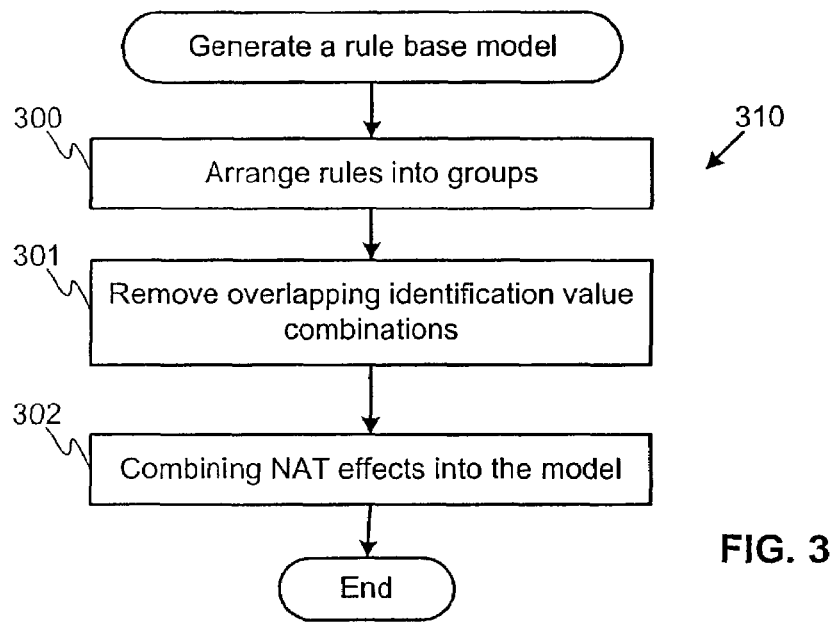
FIG. 3 is a flow diagram illustrating generation of a rule base model according to the invention.
FIGS. 4 and 5 illustrate exemplary processing rule bases.

In the validation process of the invention and FIGS. 2A and 2B, a rule base model is used according to one aspect of the invention. FIG. 3 is a flow diagram illustrating generation of such rule base model. First, rules of the rule base are arranged into groups of rules in step 300 for example on the basis of services (which are indicated by port numbers). The order of the groups may be for example arbitrary or alternatively the order may be also predefined or arranged according to the port numbers. One rule may be put into more than one group since one rule may concern more than one service. For example ICMP includes echo request and echo reply services, and a rule concerning ICMP needs to be put into echo request group and echo reply group. The grouping may be accomplished by employing a tree structure wherein the services form the branches and the rule form the leaves.

Then overlapping identification value combinations are removed from the rules in step 301. This means removing the effect of the order of the rules in the rule base from the model. For example, if source and destination address ranges of a first rule of a service group are included in one of the subsequent rules of the service group, the corresponding address ranges are removed from said subsequent rules for determining effective address range for each rule in the model. This is done separately for each service and after this process the rules of the processing rule base model include only the real address ranges they can match.

In step 302, the effects of NAT rules are combined into the model. For this purpose, a NAT rule base model may be defined for the NAT rules in the way described in steps 300 and 301. The rules in the rule base model, which are defined to be modified in the NAT rules, are modified accordingly. Other rules remain unchanged. In this way, the effective rules in the rule base are evaluated to the rule base model. It must be noted that in some implementations, NAT rules may be applied before processing rules. In such case, combining effects of NAT rules enables validation of processing rules without the effect of NAT. This is however straightforward for a man skilled in the art and is not considered here any further.

In the following, the invention is explained in more in connection with examples. The presented examples are simple for the sake of clarity, but can be easily extended to more complex contexts.

FIG. 4 illustrates an exemplary processing rule base 400, where the rules comprise a source and destination address, service and action fields. (The source and destination address and service constitute the identification values in the rules.) The processing rule base 400 may be devised from a certain template rule base managed by a super user. Alternatively, the rule base may be defined from scratch.

The processing rule base 400 allows HTTP traffic from a source B to a destination C to proceed (rule #401). HTTP traffic from a source A to a destination C is refused (#402). Rule #403 discards all other data packets from any source to any destination. As a general effect of the access rule base 400 comprising rules #401, #402 and #403 is that packets from other source than B or to other destination than C or on other service than HTTP are not allowed.

Now the scenario, where the processing rule base 400 is evaluated against the following exemplary validation rule base comprising one rule, can be imagined:

| | Validation Rule Base | | | |
|---|---|---|---|---|
| Rule # | Source | Destination | Service | Required action |
| 1 | A | C | HTTP | Refuse |

In order to pass the validity check the processing rule base needs to conform to each rule of the validation rule base. The action or actions defined in the processing rule base for the identification fields of the validation rule are evaluated and compared to the required action in the validation rule. If the action(s) obtained from the processing rule base fulfil the requirement(s) of the required action in the validation rule, the validation is passed. In this case the rule #402 defines the action refuse for the identification field values of the validation rule. Thus the action obtained from the processing rule base conforms to the required action of the validation rule and the processing rule base 400 passes the validation process. (Herein it is assumed that A and B may contain more than one address, but that they do not overlap.)

In a second exemplary scenario the processing rule base 400 is evaluated against another exemplary validation rule base (below) comprising two rules:

Validation Rule Base

| Rule # | Source | Destination | Service | Action |
|---|---|---|---|---|
| 1 | B | C | HTTP | Allow |
| 2 | ANY | ANY | HTTP | Refuse or Discard |

First, the action defined in the processing rule base for the identification field values of the validation rule #1 are evaluated. According to the rule #401 the action is allow, which fulfils the requirement set in the validation rule and the process proceeds to validation rule #2. Rule #402 fulfils the requirement of the validation rule #2 for the part of source A and destination C. However, one rule does not fully fulfil the requirement of the validation rule and the process proceeds to next rule in the processing rule base for validating rest of the validation rule (other source addresses than A, other source addresses than C and other services than HTTP). The rule #403 fulfils the rest of the requirements of the validation rule #2, and thus the actions obtained from the processing rule base conform to the required actions of the validation rules and the processing rule base 400 passes the validation process.

In a third exemplary scenario the processing rule base 400 is evaluated against still other exemplary validation rule base (below) comprising two rules:

Validation Rule Base

| Rule # | Source | Destination | Service | Action |
|---|---|---|---|---|
| 1 | B | C | HTTP | Refuse |
| 2 | ANY | ANY | ANY | Discard |

Also now the action defined in the processing rule base for the identification field values of the validation rule #1 is evaluated first. According to the rule #401 the action is allow, which does not fulfil the refuse requirement set in the validation rule and therefore the processing rule base 400 does not pass the validation process. In order to identify the problem to the administrator the rule #401 may be highlighted or otherwise communicated to the administrator.

In this situation, it is not required to proceed to validation rule #2. However, this is possible and can be done if all possible conflicts with the validation rule base need to be revealed. In this case the requirement of the validation rule #2 is fulfilled though and no further notifications for the administrator would result from continuing processing of the validation rule base.

FIG. 5 illustrates another exemplary processing rule base 500, which is a simplified example of a processing rule base with overlapped, ambiguous and sometimes also inconsistent definitions, such as rules #501 and rule #503, which easily occurs even with professional administrators due to different configuration possibilities and especially when more than one administrators modify the rule base independently. Clearly a real life rule base would be considerably larger than the example here, but the principles are the same as shown herein. The processing rule base 300 discards data packets from source A to destination E on ICMP and HTTP service according to rules #501 and #502. Rule #503 allows ICMP from A to B, C or E (however, ICMP from A to E is never allowed since the rule #501 discards it). Rule #504 allows HTTP from A to C and rules #505 and #506 allow any traffic from A to D or E and to C or F, respectively.

FIG. 6 illustrates an exemplary NAT rule base 600 according to one embodiment of the invention. As stated above, NAT rules are processed after a matching processing rule is found for a data packet. For example, if a HTTP data packet from A to C is allowed according to a processing rule base, rule #601 of the NAT rule base is then applied to the data packet and the original destination address of the data packet to be processed will be changed from C to E. Similarly for ICMP packets from A to B the destination is changed to F and for ICMP packets from other than A (ANY-A) to B on ICMP destination is changed to E according to rules #602 and #603. NAT may concern also port numbers or services since a service is defined by port number in a data packet, but handling of port numbers is not shown in this example for the sake of clarity.

FIGS. 7 and 8 illustrate generation of a rule base model for the exemplary processing rule base of FIG. 5. In FIG. 7 the processing rule base 500 of FIG. 5 is arranged into groups of rules on the basis of the services defined in the rules. Some of the services may include more than one service, like ANY service, which includes all possible services, such as for example HTTP and ICMP services and like ping-service, which includes for example echo request and echo reply-services. Rules comprising such services are placed to a plurality of service groups in the processing rule base model.

The processing rule base model may alternatively be generated also in some other way, such as on the basis of the source address, destination address or some other possible identification value of the rule base for example. The processing rule base model may be imagined also as a tree structure, wherein different services form branches and rules defined for a service form leaves in the branches.

In the processing rule base model 700 all rules concerning HTTP service (rules #502, #504, #505, #506) have been arranged together into a HTTP group, all rules concerning ICMP service (rules #502, #504, #505, #506) have been arranged together into a ICMP group and rules concerning all services (ANY) are arranged into own group (rules #505 and #506). ANY service comprises also HTTP and ICMP service and therefore rules #505 and #506 have been set also in HTTP and ICMP groups.

In FIG. 8 the address ranges in the rules of the processing rule base model of FIG. 7 are modified so that each rule includes only the address ranges they can match. That is, the rules are processed from top to bottom (and service by service) and if source and destination address ranges of a first rule are included in one of the subsequent rules, the corresponding address ranges are removed from said subsequent rules. Thus, for example rule #805 defines the action (allow) only for the data packets from source A to destination D on HTTP service, but not for the packets from a source A to destination E on HTTP service as is defined in the corresponding rule #505 in the processing rule base model 700, because rule #502 already defines the action (discard) for HTTP from A to E and therefore such data packet would never match rule #505.

In the ICMP group rule #501 is first rule so it remains unchanged. The destination definition of the next rule #503 on the ICMP group overlaps with the first rule, because the destination E is defined in both rules. Therefore rule #503 is modified to rule #803 defining ICMP from A to B or C to be allowed. Similarly, the destinations E and C are removed from the subsequent modified rules #805 and #806. The definition process of the address ranges is continued in same way until all the rules of the processing rule base model are compared to the previous rules of the processing rule base model and all the overlapping definitions for the addresses are removed.

FIGS. 9 and 10 illustrate generation of a rule base model for the exemplary NAT rule base of FIG. 6. The NAT rule base is arranged and modified on the basis of services and overlapping ranges the same way as the processing rule base is arranged and modified in FIGS. 7 and 8. Now rule #601 is the only rule for HTTP service and therefore it remains unchanged. Rule #602 remains unchanged as well, but from the rule #603 the source A already included in rule #602 needs to be removed. So rule #602 is modified to rule #1003 with the source modified to ANY-A (any other address than A). The principle of handling port NAT (not shown herein) in the NAT rule base model is the same as with address NAT, and therefore it is straightforward for a man skilled in the art to take port number translations into account in an implementation.

Figure 11:
FIG. 11 illustrates the processing rule base model of FIG. 8 with the effect of the exemplary NAT rules taken into account.

FIG. 11 illustrates the processing rule base model of FIG. 8 with the effect of the NAT rules from the NAT rule base model of FIG. 10 taken into account. The rules of the processing rule base model are modified according to the NAT rule base model. The processing rule base model of FIG. 11 is called herein a NATted processing rule base model.

The NATted processing rule base model 1100 is generated by making the modifications defined in the NAT rule base model to the rules in the processing rule base model to which the NAT rules match. Finding out which rules need to be modified may be done for example by starting from the first rule for HTTP service (rule #601) in the NAT rule base model 1000 and comparing it to the first rule for HTTP service (rule #502) in the processing rule base model 700. These rules do not match, and therefore the rule #502 remains unchanged. Next the NAT rule #601 is compared to the rule #504 in the processing rule base model. Now the rules match and thus the destination address of the processing rule #504 is changed from C to E according to the destination NAT rule #601 (resulting rule #1104). All rules of the processing rule base model 800 are treated similarly. Due to port NAT the service of a rule may change. In that case, the rule needs to be moved in the processing rule base model to the group indicated by the new port number. In this phase, the order of the rules in the groups does not need to be taken into account anymore, and therefore moving a rule from one group to another is simple.

Figure 12:
FIG. 12 illustrates an exemplary validation rule base.

FIG. 12 illustrates an exemplary validation rule base 1200, which is structurally similar to a processing or NAT rule base as already discussed above. The validation rules of the validation rule base contain one or more identification values and a required action. The required action defines which actions are valid in the rule base to be validated for a data packet defined by associated identification values. For example, only the required action may define one specific action to be allowed or give a list of allowed actions. Alternatively, it may be defined that any action is allowed. In fact, there is no need to validate the rule base against a validation rule defining all actions allowed, since any kind of rule base passes such validation rule. So a validation rule base in accordance with the invention may comprise both restricting and forcing rules.

Rule #1201 of the validation rule base model 1200 defines that the action in the rule base for HTTP from A to E must be discard, rule #1202 defines that the action in the rule base for HTTP from B to C must be allow, and rule #1203 defines that the action in the rule base for ICMP from A to E must be refuse or discard. Now if one considers that the validation rule base is made by a super user and an administrator is allowed to modify a rule base, the administrator needs to strictly follow definitions in the validation rules #1201 and #1202 and to choose either refuse or discard for ICMP from A to E. In addition to this, there are no restrictions for the administrator actions in this case. However, it is clear that any kind of restrictions or security checks can be defined by means of a validation rule base. Also an administrator may define validation rules in order to check that the configuration (including a rule base and possibly a NAT rule base) he/she has defined fulfils the requirements and operates the way it should be operating. This way the amount of human errors in managing configuration can be reduced.

Figure 13:
FIG. 13 illustrates an exemplary validation rule base model.

FIG. 13 illustrates an exemplary validation rule base model 1300 derived from the validation rule base 1200 of FIG. 12. The validation rule base model is created in the same way as the processing rule base model and NAT rule base models above and is therefore not discussed herein any further. The reason for creating a model of the validation rule base as well is to facilitate validation of a rule base. However, if the validation rule base is already defined so that it is not necessary to create the model, this step may be skipped.

After creating the processing rule base model and the validation rule base model the validation process of the processing rules may be performed by comparing rules of the validation rule base or validation rule base model with rules of the processing rule base model. In the validation process it should be noticed, that when the processing rule base model is validated, all of the validation rules of the used validation rule base must be valid. In principle the validation rules are taken one by one and the action the rule base has for data defined in the identification fields of the validation rule is determined. Then it is checked if this action fulfils the requirement defined in the validation rule (conforms to the required action defined in the validation rule). No rule in the processing rule base model is allowed to be in conflict with the validation rules or otherwise the processing rule base fails the validation.

In addition it should be noticed that one rule of the processing rule base model may fulfil one validation rule only partly. For example a validation rule may require that a HTTP from A, B or C to E is refused or discarded and in the processing rule base model there is a first rule which discards ANY packets from A to E and a second rule which refuses HTTP from B or C to ANY address. In this case, the validation rule is fulfilled by the combination of the first and second rules. Therefore, the effect of the rules in the processing rule base model may need to be summoned up in order to verify that one validation rule is fully fulfilled as required.

For example, if the processing rule base model 1100 by is validated by using the validation rule base model 1300, first HTTP service group is considered. The action defined in the rule base model for the source and destination of the validation rule #1301 is determined to be discard or allow (rules #502 and #1104). This does not conform to the requirement set in validation rule #1301 and therefore the validation process fails this validation rule and consequently the whole validation process. The processing rule base would fails also the validation rule #1302, since #1302 requires that HTTP from B to C is allowed, but the processing rule base does not define any action for this source-destination combination, and therefore the action defined for it cannot be resolved. The processing rule base would pass the validation rule #1303, though.

The validation process may be terminated, when the first conflict appears, or alternatively it may be continued. The rule not in accordance with the validation rule set may be highlighted to the user, so that finding the problem is easier. For example, if at least one rule to be validated is in conflict with at least one rule of the validation rule base model, the rule being in conflict is highlighted in order to inform the user. Also on the contrary if a rule of the validation rule base defines some requirement and any rule of the processing rule base model does not fulfil a requirement of a rule of the validating rule base, the rule of the validating rule base defining the requirement is highlighted in order to inform the user. In addition, an error message may be also generated if there is some conflict in validation process.

Figure 14:
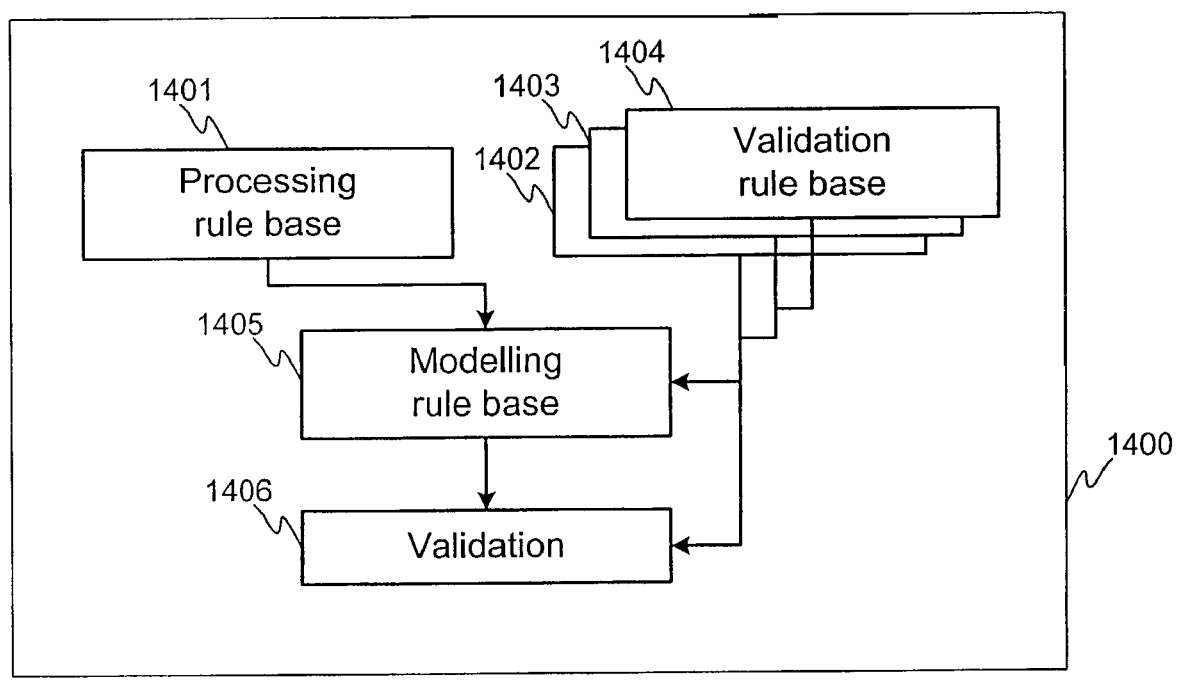
FIG. 14 is a simplified block diagram illustrating arrangement according to the invention.

FIG. 14 is a simplified block diagram illustrating an arrangement 1400 according to the invention, where the methods described above may be used. The figure is not meant to restrict the use of the invention in any way, but only to illustrate a possible implementation in a simplified form. A processing rule base 1401 is validated according to the invention in validating mechanism 1406 by means of validation rule bases 1402, 1403 and 1404. Before the validation rule base models are generated for the processing rule base and the validation rule bases in rule base generation mechanism 1405. However, it is possible that the validation rule bases are readily available in modelled form for the validation mechanism and therefore need not be modelled separately for each validation process.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention claimed is:

1. A method of managing configuration of a network node, the configuration comprising a processing rule base, which contains rules to be used in the network node for filtering data packets, the rules comprising one or more identification values for identifying a data packet and an action, said method comprising
    validating the configuration of the network node by evaluating each rule in a new or modified processing rule base against requirement defined in a validation rule base, and accepting the processing rule base for the network node only if the requirements are fulfilled, the validation rule base comprising at least one validation rule having one or more identification values and at least one associated required action.

2. A method according to claim 1, wherein the evaluating comprises:
    finding the at least one action defined in the processing rule base for at least one identification value of a validation rule,
    passing the validation rule, if said at least one action conforms to the required at least one action in said validation rule, and failing the validation rule, if said at least one action does not conform to the required at least one action in said validation rule, and
    passing the validation, if all validation rules are passed.

3. A method according to claim 1, comprising validating the configuration as a response to a predefined action.

4. A method according to claim 3, wherein the said predefined action is a command by a user to perform the validation, starting up of the network node, uploading a new or modified configuration to the network node or saving a configuration.

5. A method according to claim 1, comprising rejecting the configuration, if the requirements defined in the validation rule base are not fulfilled.

6. A method according to claim 1, comprising generating an error message, if the requirements defined in the validation rule base are not fulfilled.

7. A method according to any one of claims 2 to 6, comprising outputting a rule of the processing rule base, which does not conform to a validation rule.

8. A method according to claim 1, wherein several administrators are allowed to modify or create a processing rule base and in that a super user is allowed to modify or create a validation rule base.

9. A method according to claim 1, wherein an administrator is allowed to modify or create a processing rule base and a validation rule base.

10. A method according to claim 1, comprising
    generating a processing rule base model corresponding to said processing rule base and indicating the effective processing rule base rules, and
    using the processing rule base model in the evaluation of each rule in the new or modified processing rule base.

11. A method according to claim 1, comprising
    generating a validation rule base model corresponding to said validation rule base and indicating the effective validation rule base rules, and
    using the validation rule base model in the evaluation of each rule in the new or modified processing rule base.

12. A method according to any one of claims 10 and 11, wherein generating a processing or a validation rule base model comprises
    arranging rules of the rule base into groups of rules, the rules in a group having a common identification value while keeping a track of the order of the rules in the rule base.

13. A method according to claim 12, wherein one group corresponds at least one service or port number.

14. A method according to claim 10 or 11, wherein generating a processing or a validation rule base model comprises:
    if there exist overlapping identification value combinations in two or more rules of the rule base, maintaining the first one of the two or more rules in the order of the rules unchanged and removing such overlapping identification values from others of the two or more rules for determining the effective identification values in each rule.

15. A method according to claim 10 or 11, wherein generating a processing or a validation rule base model comprises
    combining the effects of NAT (Network Address Translation) rules into said processing rule base model by changing addresses and/or port numbers of rules in said processing rule base to real addresses and/or port numbers.

16. A method according to claim 1, wherein said processing rule base is an access rule base or a routing table.

17. A method according to claim 1, wherein said network node is a security gateway, a firewall, a router or a VPN (Virtual Private Network) gateway.

18. A computer-readable medium, containing a computer software which, when executed in a computer device, causes the computer device to provide a routine for managing configuration of a network node, the configuration including a processing rule base, which contains rules to be used in the network node for filtering data packets, the rules including one or more identification values for identifying a data packet and an action, said routine comprising validating the configuration of the network node by evaluating each rule in a new or modified the processing rule base against requirements defined in a validation rule base, and accepting the processing rule base for the network node only if the requirements are fulfilled, the validation rule base comprising at least one validation rule having one or more identification values and at least one associated required action.

19. A computer-readable medium according to claim 18, wherein the evaluating comprises:

finding the action(s) defined in the processing rule base for identification value(s) of a validation rule, passing the validation rule, if said at least one action conforms to the required at least one action in said validation rule, and failing the validation rule, if said at least one action does not conform to the required at least one action in said validation rule, and passing the validation, if all validation rules are passed.

20. An arrangement for managing configuration of a network node, the configuration including a processing rule base, which contains rules to be used in the network node for filtering data packets, the rules including one or more identification values for identifying a data packet and an action, the arrangement comprising:

a validation mechanism for validating the configuration of the network node by evaluating each rule in a new or modified the processing rule base against requirements defined in a validation rule base, and accepting the processing rule base for the network node only if the requirements are fulfilled, the validation rule base comprising at least one validation rule having one or more identification values and at least one associated required action.

21. An arrangement according to claim 20, wherein the validation mechanism is arranged to:

find the at least one action defined in the processing rule base for at least one identification value of a validation rule, pass the validation rule, if said at least one action conforms to the required at least one action in said validation rule, and to fail the validation rule, if said at least one action does not conform to the required at least one action in said validation rule, and pass the validation, if all validation rules are passed.

* * * * *